May 11, 1943.  C. WOOD  2,319,096
FISH LURE
Filed Sept. 23, 1941
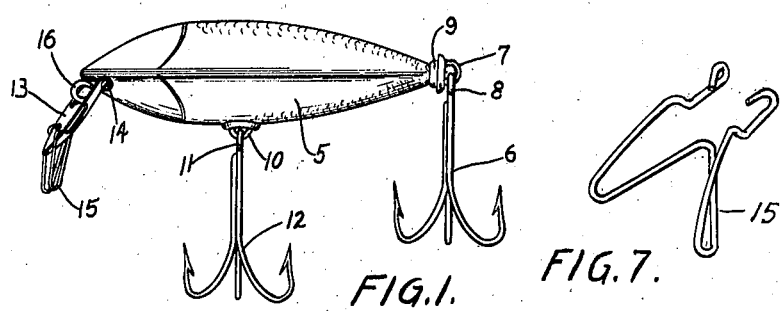
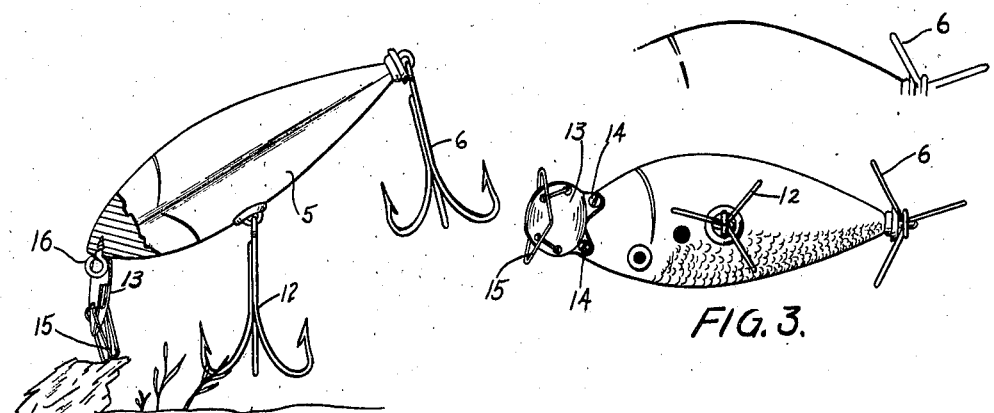
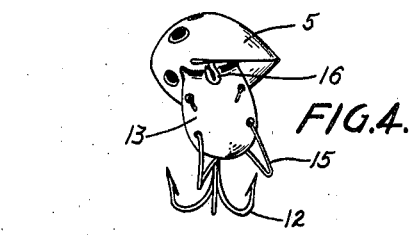
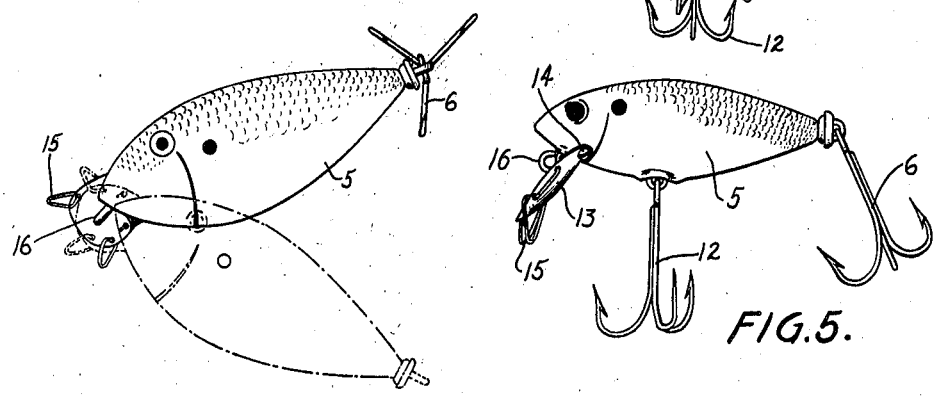
INVENTOR.
Conrad Wood
BY Mark M. Slough
HIS ATTORNEY Patented May 11, 1943

2,319,096

UNITED STATES PATENT OFFICE 2,319,096

FISH LURE

Conrad Wood, Geneva, Ohio, assignor to The American Fork & Hoe Company, Cleveland, Ohio, a corporation of Ohio Application September 23, 1941, Serial No. 412,015

9 Claims. (Cl. 43—39)

My invention relates to fish lures and relates more particularly to fish lures of the type which include a body or plug closely simulating the appearance of a minnow or other form of small fish life.

It is an object of my invention to provide such improved fish lure as to simulate a crippled minnow or some other form of life upon which fish tend to feed.

A further object of my invention is to provide a lure which will clear obstructions in such manner as to protect the hooks and prevent snagging of the same upon the obstructions.

Another object of my invention is to provide a fishing lure which will wobble and turn when being pulled through the water whereby the movements of a live fish or minnow are imitated and larger fish attracted.

A further object of my invention is to provide an improved lure of the type described which will be economical in manufacture, durable and highly efficient in use.

Other objects of my invention and the invention itself will become more apparent from a review of the following description wherein reference is had to the accompanying drawing in which:

Fig. 1 is a side elevational view of a fish lure constructed in accordance with my invention;

Fig. 2 is a side elevational view of the lure of Fig. 1 showing the same as tilted by reason of the encounter of the guard with an obstruction;

Fig. 3 is a bottom plan view of the lure;

Fig. 4 is a front elevational view of the lure;

Fig. 5 is a side elevational view of a lure embodying a modification of my invention; and Fig. 6 is a top plan view of the lure of Fig. 1 showing the various operative positions which the lure takes when moving through the water.

Fig. 7 is an enlarged detailed view of the guard of Figs. 1 to 6 inclusive.

Referring to the drawing more particularly, the body portion of the lure, which is indicated by the reference character 5, is constructed to simulate a crippled fish or minnow.

Hooks, indicated at 6, are secured to the tail portion of the lure and are so mounted that they swing freely in a direction away from the body portion, but are limited in their movements towards the body portion. The connecting means for the hooks 6, include an eye 7 secured to the body portion 5, the eye 7 being interlocked with the ring 8 formed on the shank of the hooks. A guard, indicated at 9, is secured at the base of the eye 7 to the tail portion of the body 5 and restricts movement of the hooks towards the body portion.

At one side of the body portion is an eye member 10 which is connected with the ring 11 of the hooks 12, permitting free movement of the hooks 12 in any direction.

At the forward end of the body portion 5, and extended laterally therefrom in a downward direction, is a concavely shaped spoon 13 which is secured in position by means of the screws 14.

As clearly shown by Figs. 1 and 3 of the drawing, the spoon also extends slightly forwardly of the body to offer resistance as the body portion is being moved through the water and by reason of its concave shape and the side mounting causing a wobbling or side-to-side movement of the body portion whereby the lure, due further to its mounting with its side portion up, is caused to simulate a crippled fish or minnow lying on its side.

As best illustrated in Fig. 5, said crippled side mounting is not essential to the practice of my invention and I have therein illustrated a lure having the conventional minnow mounting wherein the hook depends from the under side of said body and the concaved spoon is mounted at the gill portion of said body and extends at an angle thereto and forwardly thereof.

In each of the preferred embodiments of my invention, as illustrated in Figs. 1 to 6 inclusive, secured to the spoon 13 and extending beyond the free end thereof, is a guard, indicated at 15, the said guard being constructed of a length of flexible wire material formed into a V-shaped loop, as shown in Fig. 1, the loop being of such length as to extend downwardly to a point below the hooks 12, guiding the hooks 12 and protecting the same when, for example, the guard contacts obstructions, such as a submerged rock or log, whereby the minnow or lure body is caused to tilt and the points of the hooks elevated to positions above the obstructions thus preventing a snagging of the obstructions by the hooks and assisting the hooks in clearing the obstruction.

The flexible wire loops or V-shaped side guards of my invention, as shown in Figs. 1 to 6 inclusive, are preferably secured to the spoon by projecting the ends of the loop through aligned pairs of perforations in the outer edges of the spoon, the ends of the wire being bent over whereby a limited amount of flexing of the downwardly extending portions of the guard is permitted.

The eye to which the fishing line is secured is indicated by the reference character 16 and is arranged in front of the spoon at a point adjacent to the mouth of the body portion whereby the line is also protected by the guard and the spoon from encountering obstructions, so that when the lure is being pulled through the water, the guard will contact with obstructions such as a submerged rock or log, causing the body portion to tilt in a manner as illustrated in Fig. 2, with the result that the hooks are elevated to positions above the obstructions, preventing the snagging of the obstruction, by the hooks, and causing the hooks to clear the obstruction as well as preventing the line from entanglement therewith.

Due the manner of positioning the spoon, the body portion of the lure of Figs. 1 to 4 inclusive, will be drawn through the water on its side with a wobbling movement with the result that the fish swimming under the body portion is attracted, and will view the markings on the body portion which imitate the eyes and dots, gills and other markings thereon, rendering the lure exceptionally realistic and attractive to fish baited by the lure.

From the foregoing it will be seen that I have not only provided a fish lure which is exceptionally attractive and realistic, but one which has the added advantages of preventing the hooks carried thereby from snagging submerged objects to cause the lure to become broken or disconnected from the line.

It is to be understood that although I have described my invention in connection with certain specific embodiments, various other forms of the invention will become apparent and that numerous and extensive departures may be made therefrom without, however, departing from the spirit of my invention or the scope of the appended claims.

I claim:

1. A fish lure comprising a body portion constructed to simulate a fish, hooks on the body portion, a guard member secured to the body portion adjacent to one end thereof, said guard member being of such length as to extend to a point beyond the fish hooks when the lure is being drawn through the water whereby said guard member is adapted to engage an obstruction in the path of travel of the lure, whereby one end of the lure is tilted upwardly and the hooks are elevated to clear the obstruction.

2. A fish lure comprising a body portion shaped to simulate a fish, hooks extending from the tail end of the body portion, hooks extending from one side of the body portion and providing a weight whereby the body portion floats on said side, a guard member extending from one side of the body portion at a point adjacent to the head of the body portion, said guard member terminating in a line below the hooks when the lure is being drawn through the water, guarding the hooks against snagging obstructions, as the lure is being pulled through the water.

3. A fish lure comprising a body portion constructed to simulate a fish, hooks extending from one side of the body portion weighting said side and causing the body portion to float on said side, a spoon extending laterally and slightly forwardly from one side of the body portion adjacent to the head thereof, an eye member secured to the body portion at a point beyond the spoon whereby the body portion may be drawn through the water, and a guard member extending beyond the free end of the spoon and terminating at a point beyond the fish hooks when said lure is being drawn through the water, guarding said hooks.

4. A fish lure comprising a body portion constructed to simulate a fish, hooks extending from one side of the body portion weighting said side of the body portion, a spoon secured to the body portion adjacent to the head thereof and extending from said side of the body portion, a guard member comprising a length of wire material formed into a loop and secured to the spoon, the loop portion of the guard terminating at a point below the spoon when the lure is being drawn through the water, guarding the hooks.

5. A fish lure comprising a body portion constructed to simulate a fish, hooks on the body portion, a guard member extending at an oblique angle with respect to one side of the body portion, said guard member also extending forwardly of said body portion and adapted to engage an obstruction in advance of the fish hooks when the lure is being drawn through the water, whereby the body portion is tilted and the hooks moved upwardly to a position to clear the obstruction.

6. A fish lure comprising a body portion constructed to simulate a fish, hooks secured to the tail portion and central portion of the body portion, a guard member extending forwardly at an oblique angle with respect to the body portion and arranged adjacent to the end of the body portion and forwardly thereof in advance of the fish hooks, and said guard member adapted to engage an obstruction in advance of the fish hooks when the lure is being drawn through the water, tilting the rear end of the body portion upwardly whereby the hooks mounted upon the said rear end of said body portion are moved to a position to clear the obstruction.

7. A fish lure comprising a body portion constructed to simulate a fish, hooks secured at one side of the fish and intermediate the ends thereof, a guard member extending forwardly from said side of the body portion, the guard member terminating in a line at a point forwardly of said body portion beyond the pointed ends of the fish hooks mounted upon said body portion, guarding the pointed ends of the fish hooks when the lure is being drawn through the water, and an eye member secured to the body portion at the base of the guard member to which a fishing line is secured, whereby the rear end of the body portion is tilted upwardly when the guard member strikes an obstruction, the hooks clearing the obstruction.

8. A fish lure comprising a body portion constructed to simulate a fish, hooks secured to the body portion, a guard member comprising a length of wire material formed into a loop, secured to the body portion, the guard member extending to a point forwardly of said body portion beyond the hooks mounted upon said body portion, means for securing a fishing line to the body portion at a point adjacent to the inner end of said guard member whereby said guard member will engage any obstructions in advance of the hooks whereby said body portion is caused to tilt upwardly and the hooks carried thereby moved to clear the obstruction engaged by said guard member, when the line is being pulled through the water.

9. A fish lure comprising a body portion constructed to simulate a fish, a hook loosely mounted at the tail end of said body, a hook loosely mounted on one side of the body portion and constituting a weight whereby the body portion is disposed to float on said side, a spoon integrally secured to the body portion forwardly thereof and secured to the side portion of the lure upon which the second named hook is secured, said spoon being concave and extending forwardly of the lure and downwardly of said lure when the lure floats on its side.

CONRAD WOOD.